United States Patent

Case

[11] Patent Number: 5,692,268
[45] Date of Patent: Dec. 2, 1997

[54] FLEXIBLE SECURING DEVICE

[76] Inventor: Richard N. Case, 2525 Arapahoe Ave., Suite E4-277, Boulder, Colo. 80302

[21] Appl. No.: 681,716

[22] Filed: Jul. 29, 1996

[51] Int. Cl.⁶ .............................. B65D 63/00; F21V 33/00
[52] U.S. Cl. ............................ 24/16 PB; 24/335; 24/339; 224/41
[58] Field of Search ....................... 24/16 PB, 17 B, 24/335, 339; 224/41, 924, 935

[56] References Cited

U.S. PATENT DOCUMENTS

| | | |
|---|---|---|
| 248,108 | 10/1881 | Odiorne. |
| 1,053,126 | 2/1913 | Fuller et al.. |
| 2,373,328 | 4/1945 | Morehouse. |
| 3,204,901 | 9/1965 | Dunn. |
| 3,210,033 | 10/1965 | Deardorf. |
| 3,393,311 | 7/1968 | Dahl. |
| 3,588,964 | 6/1971 | Dudley et al. ............. 24/16 PB |
| 3,593,950 | 7/1971 | Tetzlaff. |
| 3,981,048 | 9/1976 | Moody et al.. |
| 4,112,988 | 9/1978 | Nelson ....................... 24/16 PB |
| 4,228,485 | 10/1980 | Hubbard et al.. |
| 4,390,927 | 6/1983 | Von Feldt. |
| 4,466,159 | 8/1984 | Burrage. |
| 5,289,619 | 3/1994 | Pileggi. |
| 5,522,122 | 6/1996 | Turchick et al. .............. 24/335 |

FOREIGN PATENT DOCUMENTS

| | | | |
|---|---|---|---|
| 0692631 | 8/1964 | Canada .................. 24/16 PB |
| 1030200 | 6/1953 | France ................... 24/16 PB |
| 1299686 | 6/1962 | France ................... 24/16 PB |
| 1108514 | 4/1968 | United Kingdom ........... 24/16 PB |
| 1123931 | 8/1968 | United Kingdom ........... 24/16 PB |
| 1196366 | 6/1970 | United Kingdom ........... 24/16 PB |

*Primary Examiner*—Victor N. Sakran
*Attorney, Agent, or Firm*—Donald W. Margolis; Emery L. Tracy

[57] ABSTRACT

Devices for securing a first object to a second object, comprising a preformed, flexible strap having a first end and a second end, and including a first opening preferably located in the vicinity of the first end and a spaced apart second opening preferably located in the vicinity of the second end of the strap. The openings are designed to releasably receive the first object. A strap receiving aperture is formed in the strap intermediate the first opening and the second opening of the strap, and is designed to slidably receive one end of the strap to form a loop which is capable of encircling a second object. A method for securing and supporting a first object athwart a second object using such a strap includes the steps of encircling the second object with the strap and inserting the second end of the strap into the strap receiving aperture, releasably inserting one end of the first object into the first or second opening, releasably inserting an end of the first object into the available opening, and then pulling on both ends of the strap so that the first object and the second object are urged together, with a portion of the strap between them. The strap has specific utility for securing and supporting as a first object a flashlight or other accessory to a second object such as a bicycle in an antislipping, fixed, cushioned and predetermined position.

18 Claims, 2 Drawing Sheets

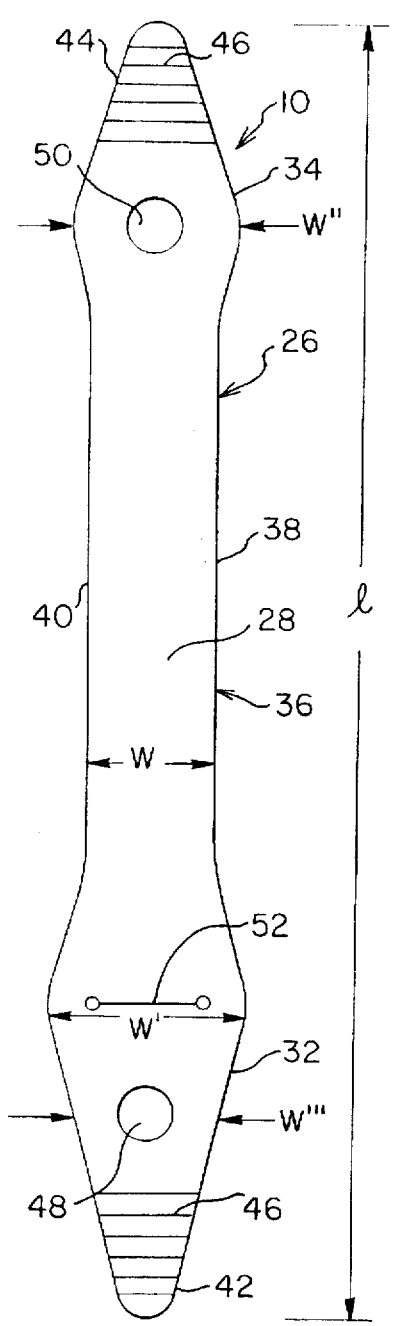
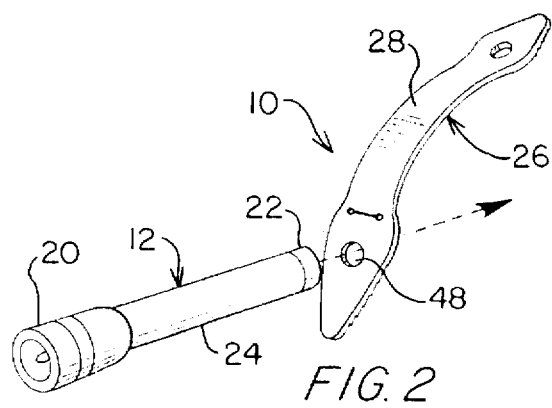
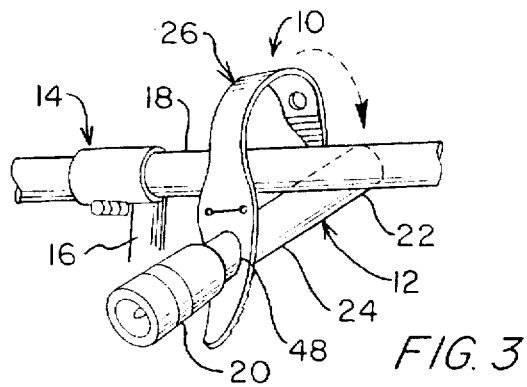
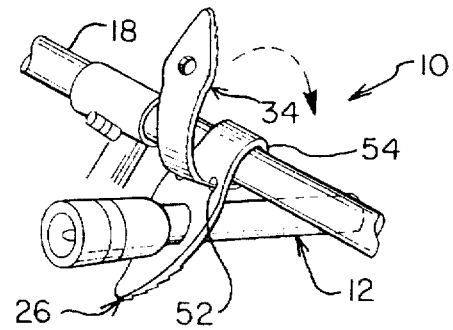
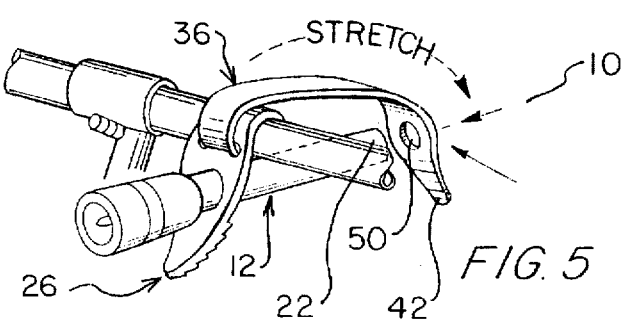

FLEXIBLE SECURING DEVICE

BACKGROUND OF THE INVENTION

1. Field of the Invention

This invention relates generally to devices for securing a first object to a second object. More particularly, it relates to flexible devices for use in securing and supporting a first object, such as an illuminating flashlight, athwart a second object, such as a bicycle frame or handlebar, at substantially right angles, and in an antislipping, shock absorbing

2. Description of the Prior Art

There are many instances where one may desire to secure a first object athwart a second object at substantially right angles. Despite the availability of many devices which can be used to secure a first object to a second object, there are no known easily storable, preformed, flexible articles which allow a person to quickly, easily and releasably secure two objects athwart one another at substantially right angles. More specifically, there are no such known easily storable, preformed, flexible articles which, once connected, can be quickly and easily released from one another, and which have little bulk, which are lightweight and easily stored or carried.

One instance where such an easily usable and storable device would be a great benefit would be for releasably securing a standard flashlight to a bicycle handlebar. Bicycle riding is no longer simply an activity enjoyed only by children on neighborhood streets and sidewalks. Recreational bicycle riding, bicycle commuting and off-road bicycling has become an important activity in the lives of many persons, especially adults. Due to circumstances these bicycling activities sometimes occur during dusk or nighttime hours, thereby placing a bicycle rider in a situation which requires a light source to both illuminate their traveling path and to make themselves visible to other persons and vehicles. One way to meet this need is for the bicyclist to have and use a light source, such as a standard flashlight, and an attachment and support device which can be used to quickly, easily and releasably connected or adjusted, such a flashlight athwart a bicycle handlebar directed to illuminate the forward path of travel, and which can also be quickly and easily released from the handlebar and flashlight, and which has little bulk, which is lightweight, and which is easily stored upon their person.

The basic idea of utilizing an attachment and support device for attaching and supporting a battery operated light or a flashlight to the handlebars or other portion of a bicycle is not new. One problem with most prior art devices and systems is that they do not allow a flashlight to be quickly and easily attached to and detached from a bicycle. Also, most standard bicycle lights are rigid, bulky, heavy devices, and it is undesirable and inconvenient to have them attached to and protruding from a bicycle handlebar at all times, as they may be damaged in case of accident or spill. Also, most such bicycle light devices require tools such as a wrench, screwdriver, pliers, or the like to attach or disconnect them from and to bicycle handlebars. Furthermore, even if such devices are removed from the bicycle during daylight hours, as noted above, they are bulky to store on the person, and most bicycles are not designed to store such devices and there connecting tools so that will be available for use when needed.

One example of a bicycle flashlight holder which would be cumbersome to store on a person after use is described in Von Feldt, U.S. Pat. No. 4,390,927. The Von Feldt patent describes a bicycle flashlight holder for attaching a flashlight to a specifically designed type of bicycle handlebars. The flashlight holder taught by Von Feldt includes mechanism which cooperates with the handlebars of a bicycle central vertical shaft and upward and horizontal connection structure connected to the shaft to prevent the holder and flashlight from rotating out of a predetermined position. It is not a universal system, and without the specific handlebar features described by the flashlight holder taught by Von Feldt, including a specific rotation prevention mechanism, the Von Feldt holder would freely rotate about the handlebars and be unreliable for illuminating the path of a bicycle rider. Furthermore, the flashlight holder taught by Von Feldt patent is extremely bulky and can not be easily stored on a person after dismounting the bicycle.

It is therefore seen that the prior art fails to teach or suggest a device in the form of an easily storable, preformed flexible article for use in quickly and easily securing and supporting first object athwart a second object, at right angles, and which device has little bulk, which is lightweight and easily stored or carried. Furthermore, the prior art fails to teach or suggest such a device which has specific utility for attaching and supporting a flashlight or other accessory on a bicycle in an antislipping manner such that it will not move or rotate after it is secured, and which is easily and quickly attachable to and detachable from both the bicycle and the flashlight or accessory, and which device can be readily carried or stored by a person, or elsewhere, so that it is readily accessible when it is needed. Neither does the prior art teach nor suggest a device for attaching and supporting a flashlight or other accessory on a bicycle, which device maintains the flashlight in a predetermined position on the bicycle without requiring specific handlebar or bicycle features, or tools for use in connecting it to the bicycle, and which device is flexible, antislipping and shock absorbing, and which protects the flashlight or accessory, once it is attached, from the normal shocks which are associated with bicycle riding.

SUMMARY OF THE INVENTION

It is therefore an object of the present invention to provide a device for use in quickly, easily and releasably securing a first object athwart a second object at substantially right angles.

It is another object of the present invention to provide such a device which is in the form of an easily storable, preformed flexible article which has little bulk, and which are lightweight and easily stored.

It is still yet another object of the present invention to provide such a device which has specific utility for attaching and supporting a flashlight or other accessory on a bicycle in an antislipping manner such that it will not move or rotate once it is attached, and which is easily and quickly attachable to and detachable from both the bicycle and the flashlight or accessory.

It is yet a further another object of the present invention to provide such a preformed device for attaching and supporting a flashlight or other accessory on a bicycle, which device can be readily carried or stored by a person, or elsewhere, so that it is readily accessible when it is needed.

It is still a further object of the present invention to provide a device for attaching and supporting a flashlight or other accessory on a bicycle, which device maintains the flashlight in a predetermined position on a bicycle without requiring specific handlebar or bicycle features, or the use of tools in connecting it to or disconnecting it from a bicycle.

It is yet another object of the present invention to provide such a device for attaching and supporting a flashlight or other accessory on a bicycle, which device is flexible, antislipping and shock absorbing, and which, once it is attached, protects the flashlight or accessory from the normal shocks which are associated with bicycle riding.

The present invention provides devices for securing and supporting a first object athwart to a second object at substantially right angles. The device comprises a preformed, flexible strap having a first end and a second end. Formed in the strap is a first opening and a second opening, said first and second openings are spaced apart from one another, with the first opening preferably located in the vicinity of or adjacent to the first end of the strap and the second opening located in the vicinity of or adjacent to the second end of the strap. The first and second openings are designed and adapted to releasably receive spaced apart portions of the body of a first object. A strap receiving aperture is formed in the strap with the strap receiving aperture positioned intermediate the first opening and the second opening of the strap. The strap receiving aperture is sized, designed and adapted to slidably receive one end of the strap to form a loop portion which is capable of encircling a second object. By encircling a second object with the strap, placing the first object in the first and second openings of the strap, and then pulling the ends of the strap, the strap urges the first object and the second object together, athwart one another at substantially right angles, with a portion of the body of the strap intermediate the first and second objects.

In the preferred embodiment of the present invention, the first opening and second opening are flexible and adapted to allow the openings to conform to and grip the cross-sectional configuration of the first object. In some embodiments the first end of the strap includes a portion having a width which is greater than the width of the second end, and with the strap receiving aperture located in that wider portion of the strap. Additionally, in preferred embodiments the strap is flat and the strap receiving aperture is in the form of a slot. In some embodiments the slot is located closer to the first opening than to the second opening. In some embodiments the strap receiving aperture is also flexible and deformable to allow it to receive and close about the portion of the strap which is inserts into it. In addition, in preferred embodiments the second end of the strap is tapered to facilitate its entry into the receiving aperture. The strap may include one or more ridge intermediate the receiving aperture and the second end, so that it is easily grasped when the ends are pulled to move the first object and the second object together.

The strap of the present invention has specific utility for securing and supporting as a first object a flashlight or other accessory to a second object such as a bicycle in a fixed, antislipping, cushioned and predetermined position. A flashlight may be secured to any portion of the bicycle frame, for example on the handlebar, positioned to illuminate the forward travel path of the bicycle. In such a use, one end of the strap is inserted into the apparatus the strap is formed into a loop portion encircling a support bar, such as a handlebar, the first or second opening releasably receives one end of a flashlight or other accessory, and the other end of the flashlight is releasably inserted into the unused opening. Then by pulling both ends of the strap, the strap urges the flashlight and support bar together, thereby maintaining the flashlight or other accessory in a predetermined position at substantially right angles to one another, for example to illuminate the travel path of the bicycle.

The present invention further comprises a method for securing and supporting a first object athwart to a second object at substantially right angles. The method comprises providing a flexible strap having a first end and a second end, the strap having a first opening and a second opening and a strap receiving aperture formed in the strap between the first opening and the second opening. By inserting the second end of the strap into the strap receiving aperture, encircling the second object with the strap, releasably inserting one end of the first object into the first or second opening, releasably inserting an end of the first object into the available opening, and then pulling on both ends of the strap. This urges the first object and the second object together, with a portion of the strap between then, while maintaining them at substantially right angles to one another.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 1 is a top view of a flexible securing and supporting device of the present invention for securing and supporting a first object athwart a second object, illustrating the preferred orientation between a first opening, a second opening, and a strap receiving aperture;

FIG. 2 is a perspective view of the flexible securing and supporting device of the present invention illustrating the positioning of a flashlight, as a first object, relative to the securing and supporting device prior to insertion of flashlight into the device;

FIG. 3 is a perspective view of the flexible securing and supporting device of the present invention illustrating the device of the present invention adjacent a handlebar of the bicycle with the first opening of the device receiving the flashlight;

FIG. 4 is a perspective view of the flexible securing and supporting device of the present invention illustrating the second end portion of the device inserted into the strap receiving aperture forming a closed loop about the handlebar of the bicycle;

FIG. 5 is a perspective view of the flexible securing and supporting device of the present invention illustrating the device being stretched to align the second opening to receive a flashlight;

DETAILED DESCRIPTION OF THE PREFERRED EMBODIMENTS

Figure 6:
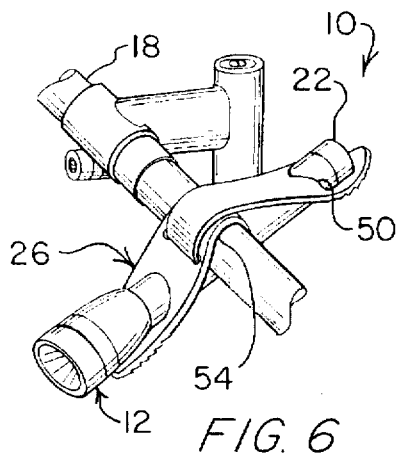
FIG. 6 is a perspective view of the flexible securing and supporting device of the present invention illustrating the second opening receiving a flashlight and urging the flashlight against the loop portion and a handlebar of a bicycle, thereby maintaining the device and flashlight in a predetermined position.

As illustrated in FIG. 1, the present invention is a device, indicated generally at 10, for securing and supporting two objects or articles together athwart one another such that the objects are at substantially right at angles to one another. The two objects to be secured can be identical or different from one another. The objects can be of equal or different length, equal or different width, equal or different weight and/or equal or different cross-sectional configuration. While the device 10 secures any two objects a substantially right angles to one another, the device 10 is particularly suited for securing and supporting a conventional flashlight 12, as illustrated in FIG. 2, or other accessory to a bicycle or other vehicle 14.

The device 10 of the present invention can be used with any type of bicycle 14. Typically, the bicycle 14 or other vehicle includes a simple framework 16 of rigid tubing of any known construction, and having a handle bar 18. It should be noted that while the device 10 of the present invention is described herein as being attached to and supported from a bicycle 14, it is within the scope of the present invention to attach and support the device 10 to objects, including, but not limited to, tree limbs, belts, fence posts, furniture, and the like.

Referring now to FIG. 2, the flashlight 12 includes a first illumination end 20, a second tail end 22 opposite the illumination end 20, and a body portion having a cross section 24 between the illumination end 20 and the tail end 22. As with the bicycle 14, the device 10 of the present invention can be used with any type of flashlight 12. The flashlight 12 can be of any variety, size or brand depending on the illumination needs of the user. Flashlights particularly suited for support on bicycle handlebars using device 10 of the present invention are pocket flashlights, including, for example, the popular MAG-LITE brand flashlights and similar flashlights. When greater illumination is desired, the use of larger flashlights is within the scope of the present invention, especially for a land vehicle larger than a bicycle, or for use off of a bicycle.

Referring again to FIG. 1, the device 10 comprises a flexible, substantially flat strap 26 having a front side 28 and a back side 30, as illustrated in FIG. 3. Referring to FIG. 1, the strap 26 further includes a first end portion 32, a second end portion 34 opposite the first end portion 32, and an intermediate portion 36 between the first end portion 32 and the second end portion 34. The intermediate portion 36 includes substantially parallel first and second edges 38, 40 extending along the mid-portion 36 substantially between the first end portion 32 and the second end portion 34 thereby creating a substantially equal width w along the entire length of the intermediate portion 36 of the strap 26. In a preferred embodiment, at the first end portion 32, the first and second edges 38, 40 initially taper outward away from each other increasing the width of the strap 26 at the first end portion 32 to a maximum width w' and then taper back inward toward each other to a first tip 42. At the second end portion 34, the first and second edges 38, 40 initially taper outward away from each other increasing the width of the strap 26 at the second end portion 34 to a width w" then taper back inward toward each other to a second tip 44. Due to the outward tapering, the width w" of the second end portion 34 of the strap 26 is greater than the width w of the mid-portion 36 of the strap 26. Also, in preferred embodiments, the width w' of the first end portion 32 of the strap 26 is greater than the width w" of the second end portion 34 of the strap 26.

While the invention has been described above as having first and second edges 38, 40 which are substantially parallel to each other along the intermediate portion 38 of the strap 26, it is within the scope of the present invention to have first and second edges 38, 40 along the mid-portion 38 of the strap 26 which are not parallel to each other. Furthermore, the present invention has also been described as having first and second edges 38, 40 which initially taper outward away from each other and then taper back inward toward each other, it should be noted that is within the scope of the present invention to have a strap 26 having a constant width w wherein the first and second edges are parallel along substantially the entire length of the strap, i.e., without tapering. The purpose and advantages of the tapered first and second edges 38, 40 at the first and second end portions 32, 34 versus the strap 26 having the constant width w will be explained in further detail below.

While any size strap 26 can be used for any size flashlight, the actual length and width of the strap 26 generally will vary depending on the size of the flashlight that is to be secured. For releasably securing and supporting standard-sized pocket flashlights on the handlebar 18 of the bicycle 14, the length l is preferably between about 7 inches and about 9 inches, the width w is preferably between about 0.5 inches and about 1.5 inches, the width w' is between about 1.0 inches and about 2.0 inches, and the width w" is between about 0.75 inches and about 1.75 inches.

Flashlights smaller than standard-sized pocket flashlights can utilize a strap 26 having lengths and widths which are less than the stated ranges. Similarly, larger flashlights tend to require straps 26 having a length and widths which are greater than the stated ranges. It should be further noted that the actual size of the strap 26 is also dependent on the strength and durability of the material used in constructing the strap 26.

The strap 26 of the device 10 of the present invention is preferably comprised of a flexible polymer material. The polymer material used for the strap 26 is substantially resilient in that the material possesses the property of immediately returning to its original size, shape, or position after being stretched, squeezed, flexed, or expanded. Furthermore, the polymer material utilized for the strap 26 the device 10 of the present invention is preferably resistant to shear and tear, has a long lifespan, and is UV and IR and weather resistant. To construct the strap 26 of the device 10 of the present invention, the strap 26 is preferably formed by injection molding 26 by known injection molding processes. Other methods of forming the strap 26 include, but are not limited to, die cutting.

The strap 26 includes a first opening 48 and a second opening 50 spaced along the length l of the strap 26. The first and second openings 48, 50 can be formed at any position along the length l of the strap 26, including at or adjacent to the first end portion 32, the second end portion 34 and/or the mid-portion 36. However, in the preferred construction of the device 10 of the present the first opening 48 be formed in the region of or adjacent to the first end portion 32 slightly beyond the maximum taper (width w') of the first and second edges 38, 40, where the first and second edges 38, 40 taper back inward to a strap width w'". It is also preferred that the second opening 50 be formed at the second end portion 34, within the maximum taper (width w") of the first and second edges 38, 40. In the preferred embodiment shown, the width w' is greater than the width w" and the width w" is greater than the width w'". In addition to easing assemblage of the device 10 of the present invention as will be described further below, the increased width of the strap 26 at the location of the first and second openings 48, 50 increases the strength of the strap 26 in these areas.

In the device 10 of the present invention, the shape of the first and second openings 48, 50 is preferably round, but could also include other shapes such as ovals, ellipses, slots, and the like. In any event, the first and second openings 48, 50 preferably have dimensions at least slightly less than the dimensions of the to-be-secured first object, such as flashlight 12, which require them to deformably stretch in order to receive either or both the illumination first end 20 and tail second end 22 of the flashlight 12 and to slidably deform about the body 24 of the flashlight 12. First and second openings 48, 50 having dimensions greater than the dimensions of the flashlight 12 are also within the scope of the present invention since the resiliency of the strap 26 itself will tend to maintain the predetermined position of the flashlight 12 on the bicycle 14. Use of the device 10 of the present invention to secure a flashlight or other accessory on the bicycle 14 will be described further below.

The strap 26 further includes a strap receiving aperture 52 formed between the first and second openings 48, 50. While the strap receiving aperture 52 can be formed at any location along the length 1 of the strap 26 including at or adjacent to the first end portion 32, the second end portion 34, or the mid-portion 36, in preferred embodiments of the present invention the strap receiving aperture 52 is located closer to the first end portion 32 at the maximum taper (width w') of the first and second edges 38, 40. As mentioned above, the increased width of the strap 26 at the location of the strap receiving aperture 52 increases the strength of the strap 26 in this area.

Preferably, the strap receiving aperture 52 is in the form of a slit or slot, but could also include other shapes such as ovals, ellipses, circles, and the like. In any event, the strap receiving aperture 52 preferably has dimensions at least slightly greater than the width w of the mid-portion 36 of the strap 26. A strap receiving aperture 52 having dimensions greater or less than the width w and lesser than the width w of the strap 26 is also within the scope of the present invention.

The strap 26 preferably includes at least one ridge 46 adjacent the first and second tips 42, 44 on the front side 28 of the strap 26. The ridges 46 provide gripping areas on the strap 26 to assist a person in installing the device 10 on the bicycle 14, and to resist slippage of the strap out of aperture 52. Installation of the device 10 and an accessory on bicycle 14 will be described in further detail below.

Referring now to FIGS. 2 and 4, installation of the device 10 and flashlight 12 on the handlebar 18 of the bicycle 12 is illustrated. Initially, second end portion 34 is inserted into the strap receiving aperture 52 forming a loop 54 completely encircling the handlebar 18 with the back side 30 of the strap 26 contacting the handlebar 18. The tail end 22 of the flashlight 12 is then aligned and positioned adjacent to the first opening 48 with the front side 28 of the strap 26 facing the flashlight 12. Referring to FIG. 3, the tail end 22 of the flashlight 12 is inserted into the first opening 48 which deforms to snugly fit about the tail end 22 of the flashlight 12. The strap 26 is manipulated from the tail end 22 of the flashlight 12, over the body portion 24, and positioned with the first opening 48 about or near the illumination end 20 of the flashlight 12. The flashlight 12 is then placed beneath the handlebar 18 and the strap 26 is maneuvered over the handlebar 18. Please note that instead of initially inserting the tail end 22 of the flashlight 12 into the first opening 48, the illumination end 20 of the flashlight 12 can be initially inserted thereby bypassing manipulation of the device 10 over the body portion 24 of the flashlight 12.

A portion of the loop 54 encircling the handlebar 18 is positioned between the flashlight 12 and the handlebar 18 to prevent the flashlight 12 from contacting the handlebar 18 of the bicycle 12, thereby providing shock absorbing properties. It should be noted that the strap receiving aperture 52 deforms to receive and pass through the increased width w" of the second end portion 34 of the strap 26. Once inserted through the strap receiving aperture 52, the second end portion 34 will tend to provide antislipping action, thereby assisting the bicycle rider in assembling the device 10 of the present invention.

Figure 7:
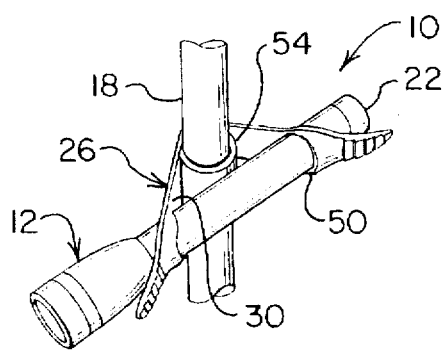
FIG. 7 is a bottom view of FIG. 6 of the flexible securing and supporting device of the present invention illustrating the second opening receiving the flashlight urging the flashlight against the loop portion and the handlebar, thereby maintaining the device and flashlight in the predetermined position.
Figure 8:
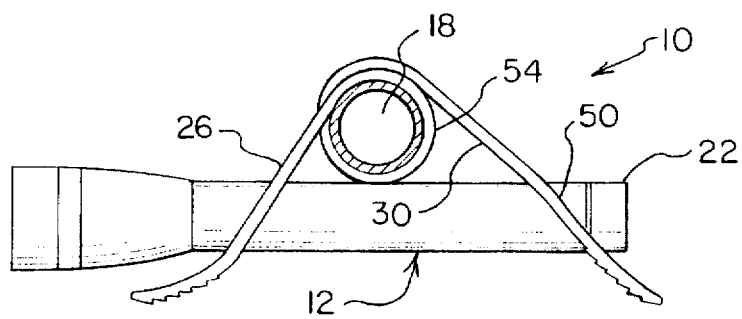
FIG. 8 is a side view of the flexible securing and supporting device of the present invention similar to the views illustrated in FIGS. 6 and 7.
Figure 9:
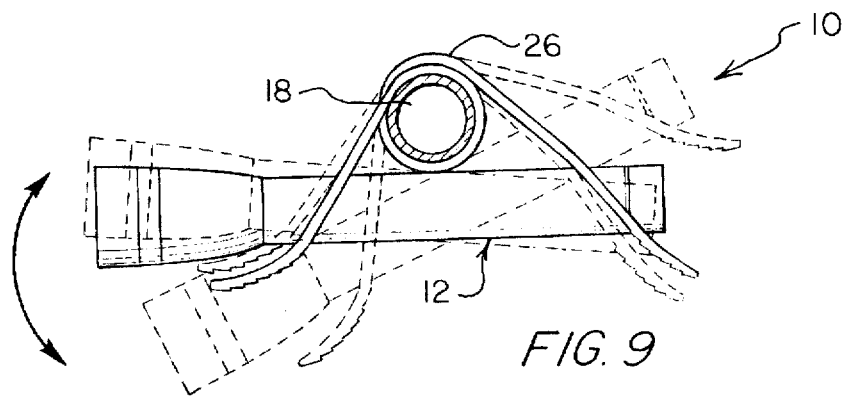
FIG. 9 is a side view of the flexible securing and supporting device of the present invention illustrating the adjustability of the device to illuminate various paths of travel.

Now, referring to FIG. 5, by using the ridges 42 to assist, the mid-portion 36 of the strap 26 is stretched to align the second opening 50 with the tail end 22 of the flashlight 12. Finally, referring to FIGS. 6, 7, and 8, the tail end 22 of the flashlight 12 is inserted into the second opening 50 which deforms to snugly fit about the tail end 22 of the flashlight 12. The resiliency of the device 10 urges the flashlight 12 toward the handlebar 18 and against the loop 54 encircling the handlebar 18. The urging of the flashlight 12 against the loop 54 increases the friction between the back side 30 of the strap 26 and the handlebar 18 maintaining the flashlight 12 and the handlebar 18 right angles to one another to each other in an antislipping manner which inhibits rotation of the flashlight 12 and device 10. In fact, with the device 10 of the present invention, rotation of the flashlight 12 is restrained by the antislipping friction between the strap 26 and the handlebar 18 despite the inherent roughness of either the road, path, or other terrain. The flashlight 12 and device 10, as illustrated in FIG. 9, can, however, be rotated by the bicycle rider about the handlebar 18 to any predetermined position simply by pushing the flashlight 12 away from the handlebar 18, depending upon the desires and illumination requirements of the rider, and all while the flashlight 12 and the handlebar 18 are maintained at right angles to one another.

The positioning of the loop 54 of the strap 26 between the flashlight 12 and the handlebar 18 also acts as a cushion or shock absorber for the flashlight 12 to assist in maintaining the projection of the flashlight's beam to the desired path. Also, the presence of the loop 54 of the resilient polymer strap 26 between the flashlight 12 and the handlebar 18 protects both the flashlight 12 and the handlebar 18 from damaging each other. The flashlight 12 and the handlebar 18 never contact each other regardless of the positioning of the device 10 or the roughness of the terrain.

Figure 10:
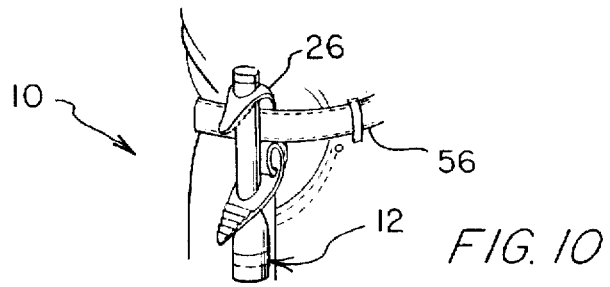
FIG. 10 is a perspective view the flexible securing and supporting device of the present invention illustrating the use of the device to carry a flashlight on a belt of a person.

The device 10 of the present invention is useful in securing and supporting any type of flashlight, notwithstanding the cross-sectional configuration of the flashlight, to a bicycle for illumination of a desired path when traveling at dusk or nighttime. The device 10 of the present invention also provides the bicycle rider to easily remove the device 10 and flashlight 12 from the bicycle 14 and to utilize the same device 10 and the same or different flashlight at his or her destination for other purposes, including attaching and supporting the device 10 and the flashlight 12 to a belt 56, as illustrated in FIG. 10, or a tree limb. The device 10 is also easily stored in the pocket, purse, or backpack of the bicycle rider without substantial additional weight or bulk and is readily available for use when needed. One preferred expedient is to wrap the strap 26 about the flashlight 12, and to insert the ends 20, 22 of the flashlight into openings 48 and 50 in order to keep them together, always ready for use.

It is therefore seen that the present invention teaches a device in the form of an easily storable, preformed flexible article for use in securing and supporting a first object athwart a second object ,at right angles, and which device has little bulk, which is lightweight and easily stored. Furthermore, the present invention teaches such a device which has specific utility for attaching and supporting a flashlight or other accessory on a bicycle in an antislipping manner such that it will not move or rotate, and which is easily and quickly attachable to and detachable from both the bicycle and the flashlight or accessory, and which device can be readily carried by a person, or elsewhere, so that it is readily accessible when it is needed. In addition, the present invention teaches a device for attaching and supporting a flashlight or other accessory to a bicycle, which device maintains the flashlight in a predetermined position on the bicycle without requiring specific handlebar or bicycle features, or tools for use in connecting it to the bicycle, and which device is flexible and shock absorbing, and which protects the flashlight or accessory from the normal shocks which are associated with bicycle riding.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

The inventions in which exclusive rights are claimed are:

1. Devices for securing and supporting a first object having a body with a first and a second end and cross-sectional configuration athwart to a second object having a body at substantially right angles to one another, the devices comprising:
   a preformed, flexible strap having a first end, and a second end;
   a first opening and a second opening formed in said strap, said first and second openings being spaced apart from one another, said first and second openings being flexible and deformable and designed and adapted to conform to and releasably grip the cross-sectional configuration of a first object; and
   a strap end receiving aperture formed in said strap, said strap end receiving aperture positioned intermediate said first opening and said second opening of said strap, said strap receiving aperture being sized, designed and adapted to slidably receive one end of said strap to thereby form a loop portion which is sized and adapted to encircle a second object; whereby, when one end of said strap is slidably inserted into said aperture to form a loop portion encircling the body of the second object, and the body of a first object is releasably inserted into said first and second openings of said strap, and said first and second ends of said strap are pulled, said strap urges the first object and the second object together, athwart one another at substantially right angles to one another, with a portion of said body of the strap adjacent to said aperture and said portion of said strap inserted into said aperture and adjacent to said aperture being intermediate the first and second objects.

2. The devices as claimed in claim 1 wherein said first opening is located in the vicinity of or adjacent to said first end of said strap and said second opening is located in the vicinity of or adjacent to the second end of said strap.

3. The device as claimed in claim 1 wherein said strap is flat and said strap receiving aperture is in the form of a slot.

4. The devices as claimed in claim 1 wherein said strap further includes a portion intermediate said first and second openings, and wherein the width of a portion of the strap between said first hole and said intermediate portion is greater than the width of said second end, and said strap receiving aperture is located within the portion of said strap having the greater width.

5. The device as claimed in claim 4 wherein said strap receiving aperture is flexible and deformable to releasably receive and hold said strap.

6. The device as claimed in claim 5 wherein said strap receiving aperture is located closer to said first opening than to said second opening.

7. The device as claimed in claim 6 wherein said strap is substantially flat and said strap receiving aperture is in the shape of a slot.

8. The device as claimed in claim 7 wherein said second end of said strap is tapered to facilitate its entry into said strap receiving aperture.

9. The device as claimed in claim 7 wherein said body of said strap carries one or more slip resistant ridge intermediate said strap receiving aperture and said second end.

10. The device as claimed in claim 1 wherein said strap is composed of a polymer material.

11. The devices of claim 1 wherein said first object is a flashlight having a body with a first and a second end and cross-sectional configuration, and the second object is a bicycle having a frame with at least one support bar, and wherein the body of the flashlight is releasably inserted into said first and second openings of said strap, and said ends of said first and second ends of said strap are pulled, in a manner such that said strap urges the flashlight and the bicycle frame support bar together, athwart one another in a predetermined position at substantially right angles to one another, with a portion of said body of said strap adjacent to said aperture and said portion of said strap inserted into said aperture and adjacent to said aperture being intermediate the first and bicycle frame support bars to provide an antislipping, shock absorbing support to said flashlight.

12. The devices of claim 11 including a flashlight having a body with a first and a second end and cross-sectional configuration.

13. Devices for securing and supporting a first object having a body with a first and a second end and cross-sectional configuration athwart to a second object having a body at substantially right angles to one another, the devices comprising:
   a preformed, substantially flat, flexible strap having a first end, and a second end, said strap further including a portion intermediate said first and second ends, and wherein the width of a portion of said strap between said first hole and said intermediate portion is greater than the width of the second end;

a first opening and a second opening formed in said strap, said first and second openings being spaced apart from one another, said first opening being located in the vicinity of or adjacent to said first end of said strap and said second opening being located in the vicinity of or adjacent to the second end of said strap, said first and second openings being flexible and deformable and designed and adapted to conform to and grip the cross-sectional configuration of a first object to thereby releasably receive spaced apart portions of the body of a first object; and a second strap end receiving aperture formed in said strap, said second strap end receiving aperture being in the form of a flat slot and positioned intermediate said first opening and said second opening of said strap, but located closer to said first opening than to said second opening, and within said portion of said strap having the greater width than said second end, said strap receiving aperture being flexible and deformable and designed and adapted to slidably, releasably receive one end of said flat strap to thereby form a loop portion which is adapted to encircle a second object; whereby, when one end of said strap is slidably inserted into said aperture to form a loop portion encircling the body of the second object, and the body of a first object is releasably inserted into said first and second openings of said strap, and said ends of said strap are pulled, said strap urges the first object and the second object together, athwart one another at substantially right angles to one another, with a portion of said body of said strap adjacent to said aperture and said portion of said strap inserted into said aperture and adjacent to said aperture being intermediate the first and second objects.

14. The devices of claim 13 wherein the first object is a flashlight having a body with a first and a second end and cross-sectional configuration, and the second object is a bicycle having a frame with at least one support bar, and wherein the body of the flashlight is releasably inserted into said first and second openings of said strap, and said first and second ends of said strap are pulled, in a manner such that said strap urges the flashlight and the bicycle frame support bar together, athwart one another in a predetermined position at substantially right angles to one another, with a portion of said body of said strap adjacent to said aperture and said portion of said strap inserted into said aperture and adjacent to said aperture being intermediate the first and bicycle frame support bars to provide an antislipping, shock absorbing support.

15. A method for securing and supporting a first object having a body with a first and a second end and cross-sectional configuration athwart to a second object having a body at substantially right angles to one another, the method comprising:

providing a preformed, flexible strap having a first end, and a second end, a first opening and a second opening formed in said strap, said first and second openings being spaced apart from one another, said first and second openings being flexible and deformable and designed and adapted to conform to and grip the cross-sectional configuration of a first object to thereby releasably receive spaced apart portions of the body of a first object and a strap end receiving aperture formed in said strap, said strap end receiving aperture positioned intermediate said first opening and said second opening of said strap, said strap receiving aperture being sized, designed and adapted to slidably receive one end of said strap to thereby form a loop portion which is adapted to encircle a second object;

slidably inserted one end of said strap into said strap end receiving aperture to form a loop portion encircling the body of the second object;

releasably inserting the body of the first object into said first and second openings of said strap; and then pulling said first and second ends of said strap, whereby said strap urges the first object and the second object together, athwart one another at substantially right angles to one another, with a portion of said body of the strap adjacent to said aperture and said portion of said strap inserted into said aperture and adjacent to said aperture being intermediate the first and second objects.

16. The method of claim 15 wherein said first object is a bicycle accessory having a body with a first and a second end and cross-sectional configuration, and said second object is a bicycle having a frame with at least one support bar, and wherein the body of the bicycle accessory is releasably inserted into said first and second openings of said strap, and said first and second ends of said strap are pulled, in a manner such that said strap urges the bicycle accessory and the bicycle frame support bar together, athwart one another in a predetermined position at substantially right angles to one another, with a portion of said body of said strap adjacent to said aperture and said portion of said strap inserted into said aperture and adjacent to said aperture being intermediate the first and bicycle frame support bars to provide an antislipping, shock absorbing support to said bicycle accessory.

17. The method of claim 16 wherein said bicycle accessory is flashlight having a body with a first and a second end and cross-sectional configuration.

18. The method of claim 17 wherein said the second object is the handlebar portion of a bicycle frame, whereby said flashlight is supported in a predetermined antislipping, shock absorbing position on said bicycle handlebar.

* * * * *